United States Patent

Pow

Patent Number: 6,076,832
Date of Patent: Jun. 20, 2000

[54] SPLIT SEAL

[75] Inventor: Martin Alexander Pow, Aberdeen, United Kingdom

[73] Assignee: Management Consultancy Services (Scotland) Ltd., United Kingdom

[21] Appl. No.: 08/973,979

[22] PCT Filed: Jun. 14, 1996

[86] PCT No.: PCT/GB96/01425

§ 371 Date: Dec. 15, 1997

§ 102(e) Date: Dec. 15, 1997

[87] PCT Pub. No.: WO97/00398

PCT Pub. Date: Jan. 3, 1997

[30] Foreign Application Priority Data

Jun. 16, 1995 [GB] United Kingdom ............... 9512267

[51] Int. Cl.⁷ ...................................................... F16J 15/16
[52] U.S. Cl. .................................... 277/546; 277/547
[58] Field of Search ..................................... 277/499, 497, 277/546, 547, 496, 498, 370, 404, 406, 407, 543

[56] References Cited

U.S. PATENT DOCUMENTS

| | | |
|---|---|---|
| 1,398,439 | 11/1921 | McMaster . |
| 1,502,524 | 7/1924 | Price, Jr. . |
| 1,925,268 | 9/1933 | Mellor ..................................... 277/25 |
| 4,155,559 | 5/1979 | Seighartner ........................... 277/93 R |
| 4,423,878 | 1/1984 | Escue ..................................... 277/1 |
| 4,486,026 | 12/1984 | Furumura et al. ...................... 277/80 |
| 4,580,793 | 4/1986 | Bronson ................................ 277/199 |
| 5,020,809 | 6/1991 | Mullaney ............................... 277/815 |
| 5,163,692 | 11/1992 | Schofield et al. ..................... 277/153 |

FOREIGN PATENT DOCUMENTS

| | | |
|---|---|---|
| 0458 352 A1 | 5/1990 | European Pat. Off. . |
| 1323320 | 5/1962 | France . |

*Primary Examiner*—Peter M. Cuomo
*Assistant Examiner*—Karlena D. Schwing
*Attorney, Agent, or Firm*—Young & Basile, P.C.

[57] ABSTRACT

A split seal (1) having an annular cross-section and a central axis (X) comprises at least two components (2,3) of arcuate form, each component having two end portions (4,4',5,5') and each end portion having a surface (F1,F2) formed and arranged for mating engagement with a respective complementary end portion surface of another of the components. Each end portion surface (F1,F2) extends in an indirect manner over one of the radial width ($\delta_r$) and the axial length (l) of the seal and each end portion surface (F1,F2) extends substantially continuously in non-reentrant manner over the other one of the radial width ($\delta_r$) and the axial length (l) of the seal so that the matingly engaged components are substantially smoothly, relatively translatable in one of a generally axial direction and a generally radial direction. In a preferred embodiment each end portion surface (F1,F2) extends in a zigzag manner.

23 Claims, 4 Drawing Sheets

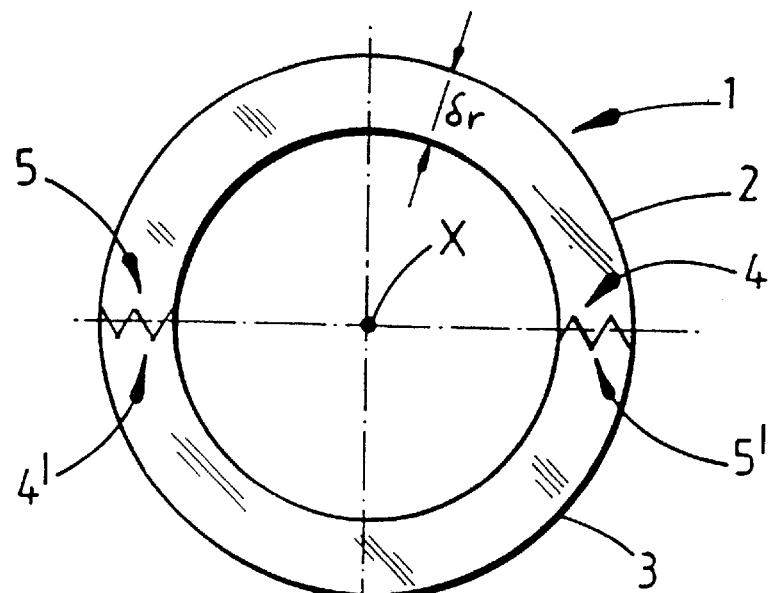
FIG.1
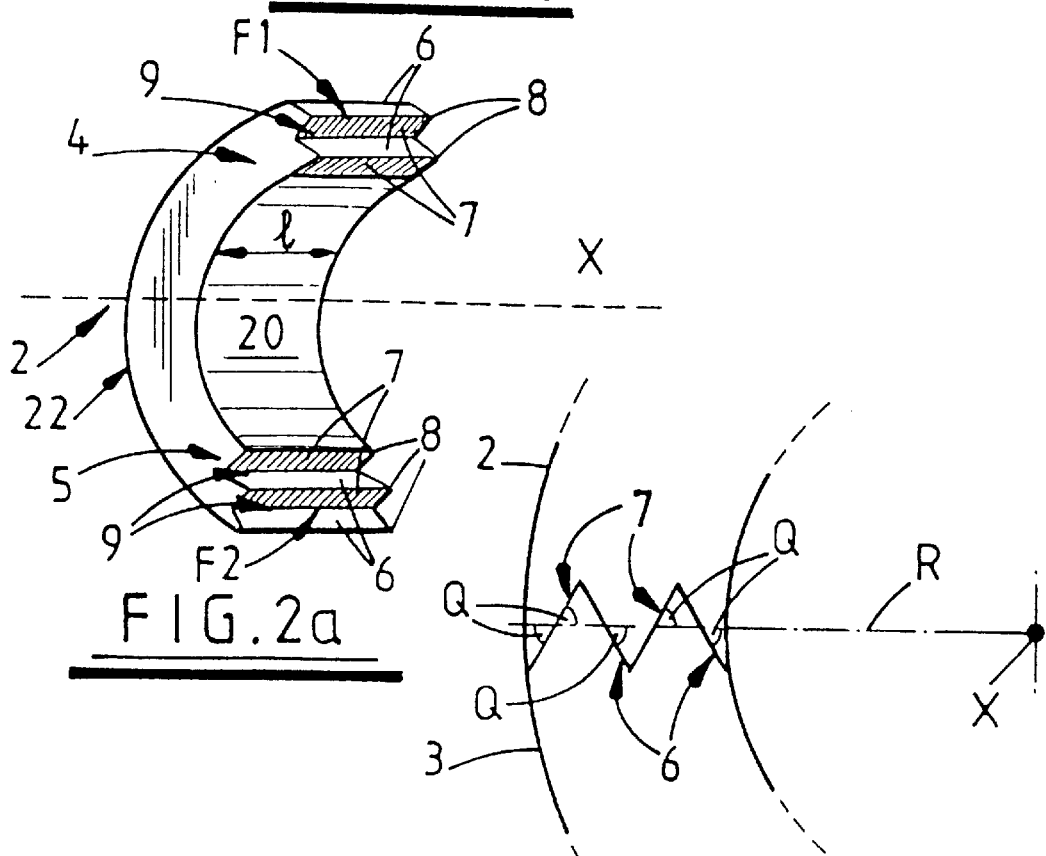
FIG.2a
FIG.2b

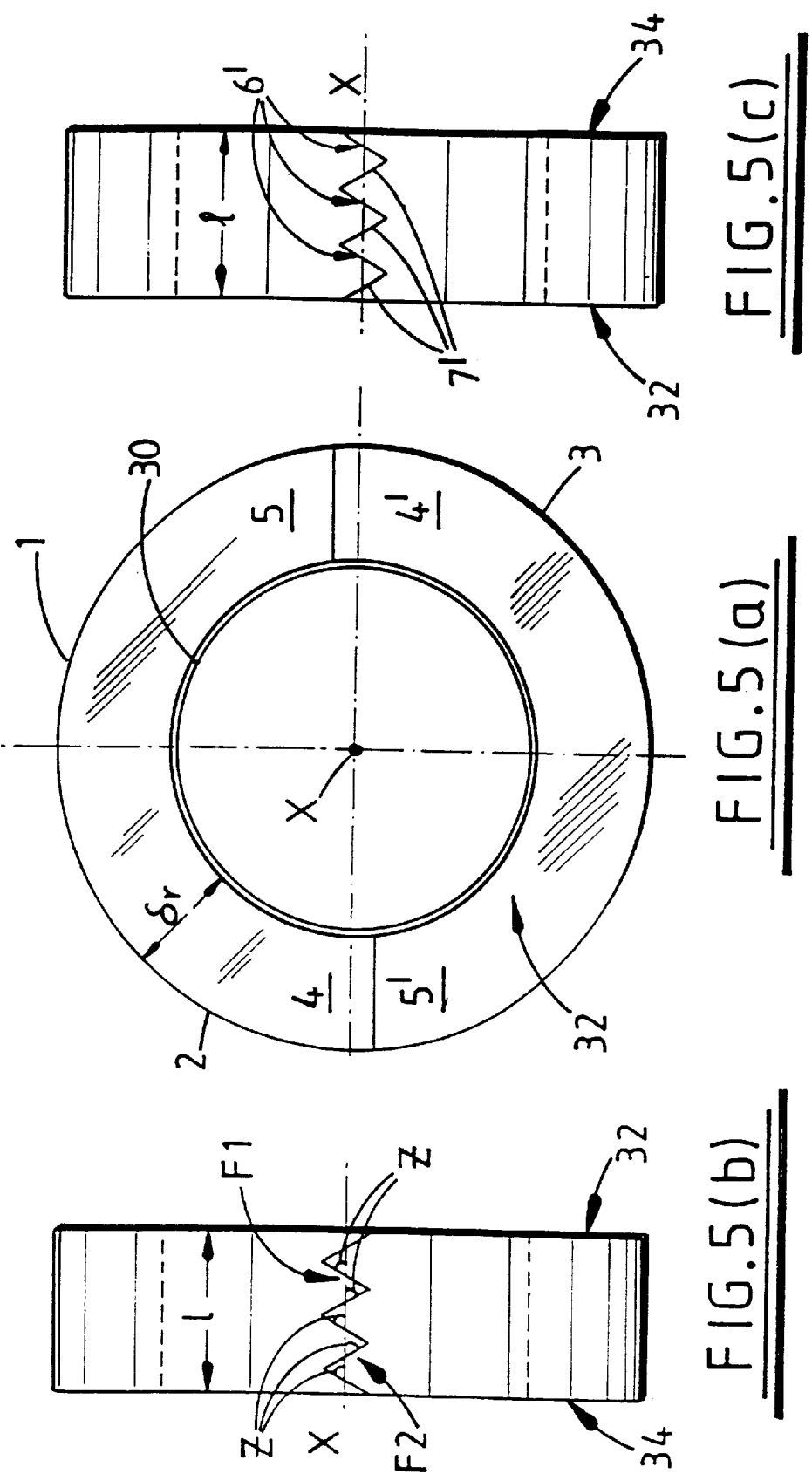

SPLIT SEAL

This invention relates to split seals for use in sealing arrangements for rotating, stationary and reciprocating elements such as, for example, positive displacement pumps and hydraulic rams or pistons, and other valve-actuated applications. Such elements are used in systems within a wide range of technical fields including the petro chemical, drilling, mining and oil industries, as well as in quarrying and power engineering fields.

One known type of split seal is formed by breaking an integral ring of material (commonly carbon) in half to form two components. In use, the two components are placed together again around, for example, a rotating shaft. The components must, however, be placed together very carefully during installation in order to avoid damage to the contact faces between the components. Such damage can result in the creation of a radial or axial leakage path across the contact faces of the seal, leading to poor and/or inadequate performance of the seal. Additionally, the two halves may be damaged on installation such that the two halves cannot mate perfectly, leading to ineffective sealing due to damage to the contact faces. Furthermore, damage to the contact faces can occur during handling of the seal which can render the seal ineffective. A further disadvantage of such seals is that grooves are cut on one axial end face of the seal, and axially on a radially inner surface of the seal, during manufacture in order to create weak points to aid breaking of the seal in two. Such grooves can allow undesirable build up of pressure at the contact faces of the seal during use which, in turn, can lead to fluid leakage in the radial direction. Fluid leaking in between the contact faces acts like a "wedge" between the two seal halves, pushing the two halves apart as the pressure increases.

Other known types of annular split seal rely on the mating of opposed planar faces which extend radially of the seal and which comprise or are coated in a hardened material such as ceramic or tungsten carbide. While such materials have a certain resilience, providing some limited protection against damage, each contact face is essentially a single plane surface, so any damage which does occur during installation or handling may readily destroy the integrity of the seal. Additionally, in use, externally applied radially inward mechanical pressure is required to maintain the contact faces in engagement.

The conventional "broken" split seals also have the disadvantage of necessitating substantial maintenance "down time" of equipment in which the seals are incorporated, due to the need to dismantle major components of the equipment to allow replacement of worn or damaged seals.

It is an object of the present invention to avoid or minimise one or more of the above disadvantages.

According to a first aspect of the present invention a split seal having an annular cross-section and a central axis, and having a radial width and an axial length, comprises at least two components of arcuate form, each component having two end portions and each end portion having a surface formed and arranged for mating engagement with a respective complementary end portion surface of another said component, in which each end portion surface extends in an indirect manner over one of the radial width and axial length of the seal, and which end portion surface extends substantially continuously in non-reentrant manner over the other one of the radial width and the axial length of the seal so that the matingly engaged components are substantially smoothly, relatively translatable in one of a generally axial direction and a generally radial direction.

Preferably, a substantial extent of each said end portion surface extending indirectly over one of the radial width and axial length of the seal is inclined at an angle thereto. Each said end portion surface may extend in a zigzag manner.

According to a second aspect of the present invention a split seal having an annular cross-section and a central axis comprises at least two components of arcuate form, each component having two end portions and each end portion having a surface formed and arranged for mating engagement with a respective complementary end portion of another said component, in which each end portion surface extends, in the plane of the annular cross-secton of the seal, at at least one portion between the radially inner and radially outer faces of the seal, at an angle to, and intersects, an outer radius of the seal and which end portion surface extends substantially continuously in non-reentrant manner axially of the seal so that the matingly engaged components are substantially smoothly, relatively translatable in a direction generally axially of the seal for assembly of the split seal around a shaft in use thereof.

In use of the split seal according to the second aspect of the invention, one or more angled surface portions of at least one end portion of each component may bear radially against one or more correspondingly angled surface portions of a respective complementary end portion(s) of another of said components due to centrifugal force acting radially outwardly on fluid which is trapped between a radially inner surface of the seal and a rotating shaft or other like element which the seal surrounds. This radial pressure acting between the components maintains the components in mating engagement and provides an effective radial fluid seal at the splits in the seal where the components engage with one another. This has the advantage of countering any tendency for the fluid to enter the splits between the engaging end portions of the components of the seal, thus preventing, or at least minimising, radial fluid leakage through the seal splits. This, in turn, enables the seal to operate at higher fluid pressures than the known conventional split seals.

Additionally, as the matingly engaged components are substantially smoothly, relatively translatable in a direction generally axially of the seal, installation may be carried out using generally axial assembly techniques, thus removing the radial assembly restrictions imposed when installing seals formed by the breaking technique, which type of seals are easily damaged by friction during any relative axial translation of the engaged components that may inadvertently occur.

According to a third aspect of the present invention a split seal having an annular cross-section and a central axis comprises at least two components of arcuate form, each component having two end portions and each end portion having a surface formed and arranged for mating engagement with a respective complementary end portion surface of another said component, in which each end portion surface extends at at least one portion between the first and second axial end faces of the seal at an angle to the central axis of the seal and which end portion surface extends substantially continuously in non-reentrant manner radially of the seal so that the matingly engaged components are substantially smoothly, relatively translatable in a direction generally radially of the seal.

The axial pressure acting between the components maintains the components in mating engagement and provides an effective axial fluid seal at the splits in the seal where the components engage with one another. This counters the tendency for fluid to enter the splits between the engaging end portions of the seal and enables the seal to operate at higher fluid pressures than known conventional split seals when used in axial fluid pressure applications.

The split seal according to the third aspect of the invention may be used in many different industrial fields in place of conventional types of lip seals and valve stem seals which are traditionally completely formed (one-piece) rings of various types and materials as required by the particular application concerned.

In the context of the present invention, the term "substantially smoothly" means that the matingly engaged components are relatively translatable while in substantially close interengagement without substantial axial force being exerted on one or more of the components in order to overcome resistance to relative translation between the components which might, for example, be presented by irregularities in any of the engaging surfaces of the components. Consequently, the components of the seal according to the second and third aspects of the present invention can be relatively translated in the generally axial or radial direction of the seal respectively substantially without causing erosion or damage to the interengaging surfaces of the components which could lead to radial or axial fluid leakage respectively between the adjoining end portion surfaces in the seal.

The relative translation of two matingly engaged components generally axially of the seal in accordance with the second aspect of the invention and generally radially in accordance with the third aspect may be achieved by substantially rectilinear movement of one component relative to the other component(s). Where the relative translation is generally axially of the seal, relative translation may however also be achieved by movement including a greater or lesser rotational component i.e. a generally helical movement of one component relative to the other(s).

In the split seal according to the second aspect of the invention each end portion of each component may be provided with a series of differently angled surface portions, each surface portion extending, in the plane of the annular cross-section of the seal, at an angle to, and intersecting, an outer radius of the seal. The series of differently angled surface portions may comprise pairs of oppositely angled surface portions. The oppositely angled surface portions may be defined by an undulating surface provided on each component end portion. Preferably, each end portion of each component comprises a toothed, preferably a generally saw-toothed, configuration. The tips of the teeth may be radiussed, preferably only to a small degree. This may increase the strength of the seal.

In use, similarly angled surface portions provided on one end portion of each component may each bear against a respective similarly angled surface portion provided on the respective complementary end portion of another component. In the split seal according to the second aspect of the invention, similarly angled surface portions on one end portion of each component may bear radially outwardly against respective similarly angled surface portions provided on the respective complementary end portion of another component. Such an arrangement presents a labyrinth-like path to any fluid which enters the "splits" in the seal, thus eliminating or minimising radial fluid leakage. In the split seal according to the third aspect of the invention, similarly angled surface portions on one end portion of each component may bear axially upwardly or downwardly against respective similarly angled surface portions provided on the respective complementary end portion of another component. This arrangement eliminates or minimises axial fluid leakage. Additionally, in either case, any damage which occurs to any one angled surface portion of any component during handling or installation of the seal will have only limited effect on the operation and integrity of the seal since the angles at which the one or more angled surface portions of each component end portion are disposed are preferably pre-determined during manufacture of the seal. Preferably, the two end portions of each component are complementary. The components are thus interchangeable and can be replaced by other components of the same dimension. This allows for easy replacement of a worn or damaged component without requiring replacement of the complete seal.

The seal according to the second aspect of the invention may be used in applications where an element which it surrounds is rotating in a clockwise or an anti-clockwise direction.

The seal may also be used in applications where it surrounds a rotationally reciprocating element, and in stationary applications where hydrodynamic pressure may act radially on the seal. At least one surface portion which extends at an angle to, and intersects, an outer radius of the seal may be provided on each end portion of each component adjacent to an inner annular surface of the seal. Preferably, these angled surface portions adjacent to the inner annular surface of the seal lead rearwardly away from the direction of rotation of the rotating element which is surrounded by the seal. By installing the seal in either an upright or an inverted orientation, the seal may be advantageously adapted to suit applications in which the seal surrounds an element which is rotating in a clockwise direction or an element which is rotating in an anti-clockwise direction. Fluid on the rotating element which enters the region between the seal and the rotating element may be effectively restricted from entering the "splits" in the seal (i.e. between the engaging surfaces of the seal) by installing the seal in an orientation in which the angled surface portions provided adjacent to the inner surface of the seal are directed away from the direction of rotation of the rotating element, and hence are directed away from fluid carried on the outer surface of the rotating element.

The seal according to the third aspect of the invention is preferably used in applications where an element which it surrounds is moving back and forth in a generally axial direction relative to the seal. The seal may also be used in stationary applications where fluid pressure acts generally axially on the first or second axial end faces of the seal.

The angled surface portion(s) are preferably cut into each component of the seal during manufacture. Where a plurality of angled surface portions are provided on each component end portion, these may be provided by angled grooves cut into the seal. The angle of each groove may be in the range of fifty to seventy degrees. Preferably the angle of each groove is substantially sixty degrees such that the acute angle between each angled surface portion and the radius is substantially sixty degrees.

The seal is preferably formed of a relatively easily worked metal such as, for example, aluminium. Alternatively the seal or the individual seal components may be injection molded or cast. Other suitable materials for the seal are those currently used as sealing materials within the sealing industry, in particular resin impregnated carbon. The surfaces of the seal components may be coated with a resilient material. This provides the seal with an overall resilient surface applicable to most uses within various industries. Cutting the required angled surface portion(s) in the end portions of each component avoids the need for the creation of weak points or grooves to aid breaking of the seal during manufacture, as required with some conventional split seals.

According to a fourth aspect, the invention comprises a component for incorporation in a split seal of annular cross section having a central axis, the component being of arcuate form and comprising two end portions and each end portion having a surface formed and arranged for mating engagement with a respective complementary end portion surface of another such component, in which each end portion surface extends, in the plane of the annular cross-section of the seal, at at least one portion between the radially inner and radially outer faces of the seal, at an angle to, and intersects, an outer radius of the seal, and which surface extends substantially continuously in non-reentrant manner axially of the seal so that the component is substantially smoothly translatable with respect to the other component, when the components are matingly engaged, in a direction generally axially of the seal.

According to a fifth aspect, the invention comprises a component for incorporation in a split seal of annular cross-section having a central axis, the component being of arcuate form and comprising two end portions and each end portion having a surface formed and arranged for mating engagement with a respective complementary end portion surface of another such component, in which each end portion surface extends at at least one portion between the first and second axial end faces of the seal, at an angle to the central axis of the seal, and which surface extends substantially continuously in non-reentrant manner radially of the seal so that the component is substantially smoothly translatable with respect to the other component, when the components are matingly engaged, in a direction generally radially of the seal.

Embodiments of the invention will now be described by way of example only, with reference to the accompanying drawings, in which:

FIG. 1 is a top view of a split seal according to the invention;

FIG. 2a is a perspective view of one component of the seal of FIG. 1;

FIG. 2b is a fragmentary top view of the split seal of FIG. 1;

FIG. 5a is a top view of an alternative embodiment of a split seal according to the invention, surrounding a piston;

FIG. 5b is a left hand side elevation of the seal of FIG. 5a; and

FIG. 5c is a right hand side elevation of the seal of FIG. 5a.

Figure 3A:
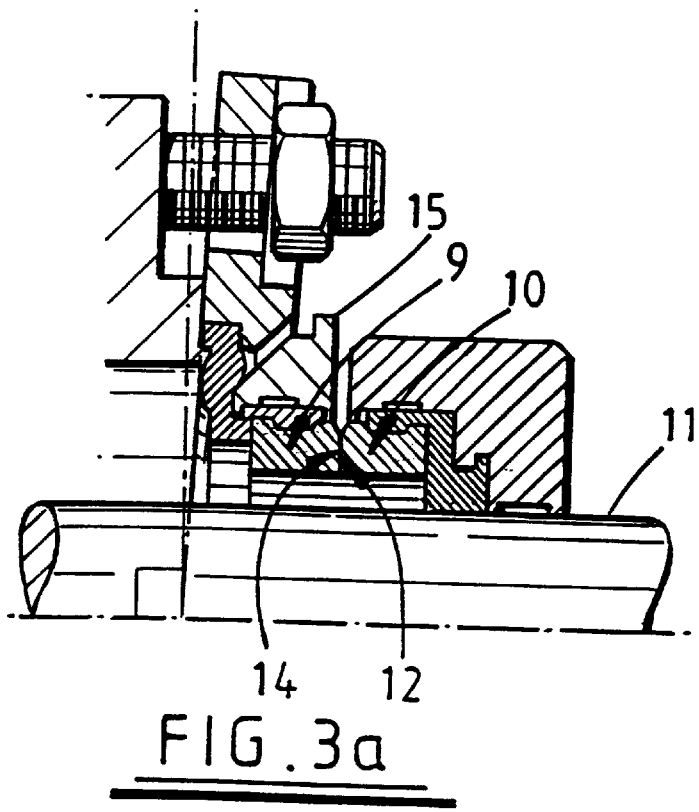
FIG. 3a is a cross-sectional side view of a shaft and housing assembly incorporating two conventional split seals.

FIG. 1 shows a split seal 1 of generally cylindrical form having an annular cross-section and a central axis X and comprising two components 2, 3 of arcuate form. The seal 1 has a radial width $\delta_r$ and an axial length l. The seal 1 has a radially inner face 20 and a radially outer face 22. Each component comprises a first end portion 4, 4' and a second end portion 5, 5'. The two components are identical and one component 2 is shown in FIG. 2a. Each end portion 4, 5 of that component 2 comprises a contact face F1, F2 defined by a series of teeth or leading edges 8 formed by grooves which are cut into that component 2 during manufacture. The two end portions of that component 2 are complementary such that the teeth of each end portion 4, 5 can be arranged in mating engagement with the teeth of the complementary end portion 5', 4' of the other component 3 of the seal so as to form the assembled split seal 1 shown in FIG. 1. The toothed configuration of the end portions provides a plurality of discrete oppositely angled surfaces 6, 7 in each contact face F1, F2 of the end portions of the two components, 2, 3. As shown in FIG. 2b, each surface 6, 7 extends, in the plane of the annular cross-section of the seal, at an acute angle Q of sixty degrees to, and intersects, an outer radius R of the seal. Each contact face F1, F2 extends substantially continuously in non-reentrant manner axially of the seal.

Figure 3B:
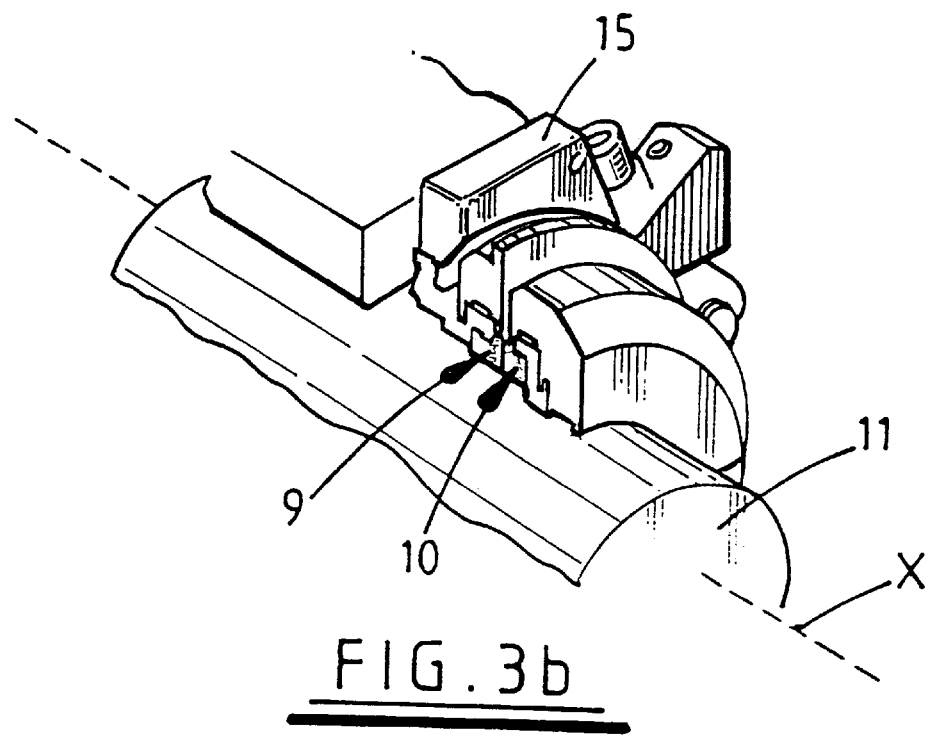
FIG. 3b is a perspective fragmentary view of the assembly of FIG. 1.

FIGS. 3a, 3b illustrate a conventional arrangement incorporating two conventional split seals. One seal 9 is mounted in a housing 15 and surrounds a shaft or piston 11 located on the axis X of the seal. A second seal 10, similar to the first, is fixed to the shaft (by clamping, bolting or otherwise) so as to rotate with the shaft. The arrangement of the two seals is such that one axial face 12 of the seal fixed to the shaft abuts an axial face 14 of the seal mounted in the housing, the seal 9 mounted in the housing remaining stationary while the seal 10, which is fixed to the shaft rotates with the shaft 11. A seal 1 according to the present invention may be used in place of either or each of the conventional seals 9, 10.

During installation of the split seal 1, the two components cannot be installed wrongly as their configuration only allows them to be mated in one way to form the annular seal 1. The contact faces F1, F2 can slide smoothly across one another in a generally axial direction during assembly of the seal without causing damage to the angled surfaces 6, 7.

In use, the fluid enters the region between the inner annular surface of each seal and the outer surface of the shaft. Fluid may also enter the region between the abutting axial faces of the seals where it acts as a lubricant before being vapourised by heat produced by friction between the axial faces of the seal. Rotation of the shaft creates hydrodynamic pressure between each seal and the shaft 11 due to centrifugal force acting radially on the fluid trapped between the seals and the shaft. This pressure acts radially on certain of the angled surfaces 6, 7 of the teeth 8 to press the components 2, 3 together. Those of the angled surfaces upon which this radial pressure acts is dependent upon the chosen orientation of the seal. The seal has an upright or an inverted orientation, in use.

Figure 4A:
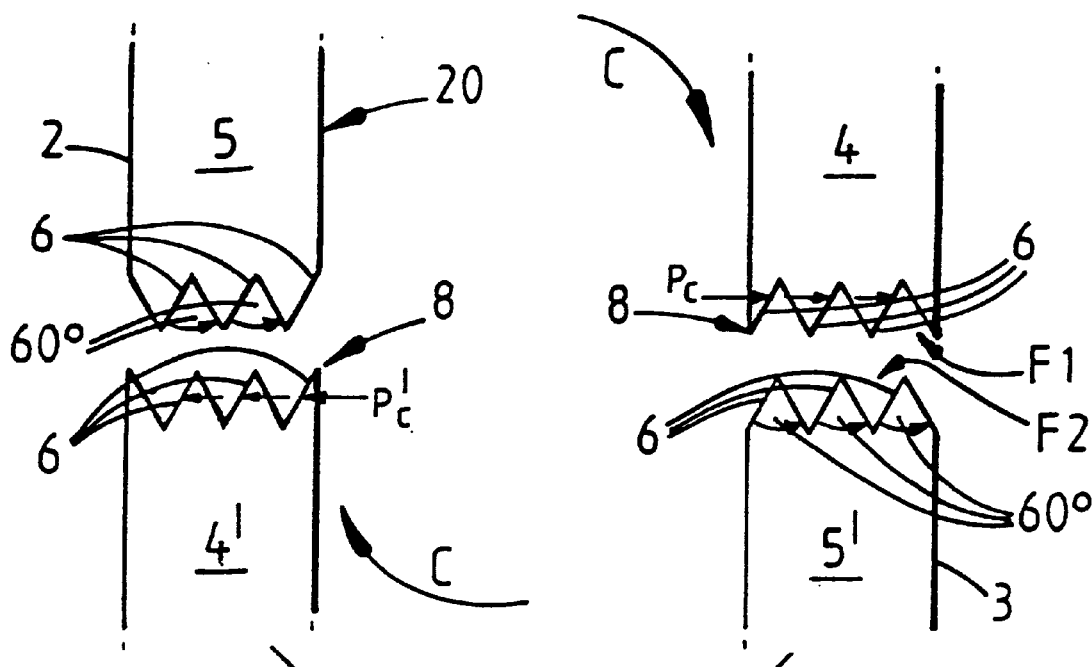
FIG. 4a is an exploded fragmentary top view of a split seal according to the invention illustrating centrifugal force acting on angled contact areas of surface areas of one end portion of each component of the seal, where the seal surrounds a shaft (not shown) rotating clockwise.

FIG. 4a illustrates one orientation of an alternative embodiment of the split seal 1, where features corresponding to the seal of FIGS. 1, 2a and 2b are correspondingly numbered, and in which parallel angled surfaces 6 of one end portion 4, 4' of each component 2, 3 press against similarly angled surfaces 6 of a respective end portion 5', 5 of the other component, in a radially outward direction (indicated by arrow Pc, Pc'). This orientation is particularly suited to the situation where the shaft is rotating in a clockwise direction, indicated by the arrows C (shaft not shown), since the angled surfaces nearest to the inner annular surface 20 of the seal are angled so as to lead rearwardly away from the direction of rotation of fluid carried by the outer surface of the rotating shaft. This tends to prevent fluid entering the splits in the seal.

Figure 4B:
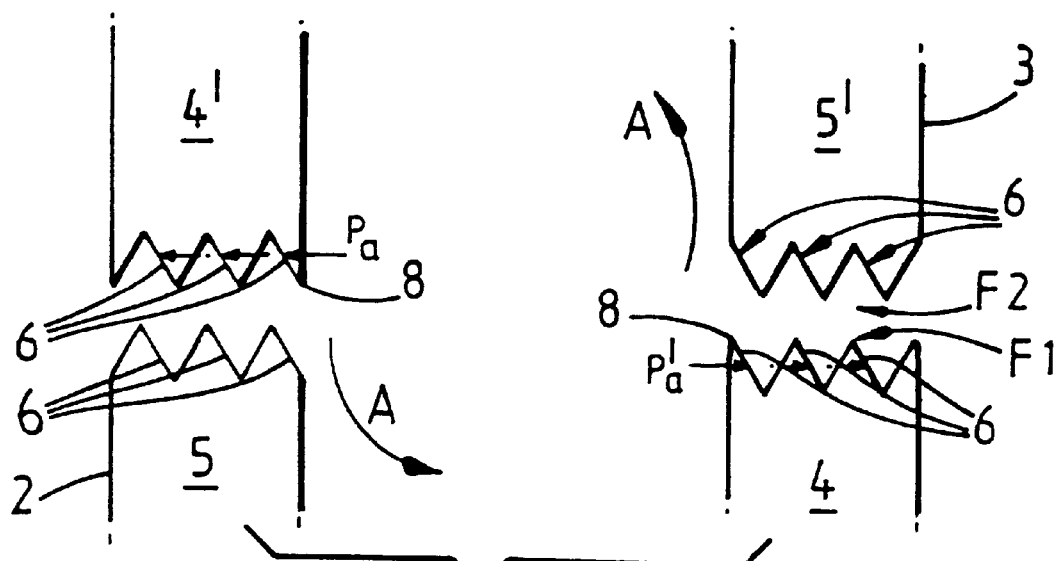
FIG. 4b is an exploded fragmentary top view of the inverted split seal of FIG. 4a indicating centrifugal force acting on angled contact surface areas of one end portion of each component of the seal, where the shaft is rotating anti-clockwise.

FIG. 4b illustrates the situation where the shaft is rotating in an anti-clockwise direction, indicated by the arrows A, and the seal 1 is in an inverted orientation. The parallel angled surfaces 6, which are now oppositely angled (with regard to the first orientation of the seal), of the same end portion 4, 4' of each component 2, 3 again press against the similarly angled surfaces 6 of the respective complementary end portion 5', 5 of the other component (indicated by arrows Pa, Pa') in a radially outward direction.

In the embodiments shown in FIGS. 4a and 4b, each end portion comprises six angled surfaces defining the teeth 8. One end portion of each component 2, 3 comprises four teeth 8 while the other end portion comprises three teeth. However, fewer or further teeth 8 may be provided on the end portions of alternative embodiments of the invention (see, for example, FIGS. 1 and 2). Similarly, the angle of the angled surfaces 6, 7 may be greater or less than sixty degress in alternative embodiments of the invention (not shown).

The angled surfaces 6, 7 can be measured and the form and dimensions of the end portions 4, 5, 4', 5' are thus capable of being accurately known. The number of angled surfaces 6, 7 which are provided on each contact face F1, F2 gives a known sealing parameter for the contact faces of the split seal.

The split seal is manufactured from a ring of relatively easily workable metal, for example, aluminium, which is cut in half to form two arcuate portions. The teeth 8 are then cut into the end portions of the cut halves to form the two components 2, 3 of the seal. The two halves are then fitted together and the seal 1 is machined to the desired dimensions. By machining the two halves this way, a specific desired number of individual angled surfaces 6, 7 may be provided.

In an alternative embodiment, the seal 1 or the components 2, 3 are injection moulded in plastics material.

Instead of manufacturing the end portions with teeth 8 defining the distinct angled surfaces 6, 7 each end portion may be provided with a continuous, undulating surface of peaks and troughs incorporating the desired angled surface portions. In this embodiment, the centrifugal forces act similarly through angled surface portions of one component end portion against parallel angled surface portions of the respective, matingly engaged component end portion. In another embodiment the tips of the teeth 8 may be radiused so as to be slightly rounded. This increases the strength of the seal.

The split seal 1 can be used in applications incorporating rotating, reciprocating or stationary elements, such as pumps and hydraulic rams or pistons, in many industrial applications and particularly in the drilling industry where the seal can be provided for full bore sealing arrangements. The seal can be manufactured to any desired dimension. Additionally the seal allows for a certain degree of misalignment which can be advantageous on large, slow rotating elements operating at low pressures.

It is believed that the split seal 1 will operate successfully at fluid pressures of up to 20 bar (290 p.s.i.) and over.

The seal components 2, 3 can be coated with a suitable material, such as a ceramic material, to give an overall resilient surface applicable to most uses within various industries. The magnitude of the inner radius of the seal can be chosen to give a desired clearance between the seal and the shaft to control the quantity of fluid trapped between the seals and the shaft or piston, which in turn provides greater or lesser lubrication between the axial faces of the two seals 9, 10.

The seal components 2, 3 can be utilised as consumables and can be interchanged, thus minimising machinery "down time" for normal routine maintenance and/or breakdowns where the necessity to strip major components for complete ring split seal replacement is not necessary.

Critical tests have found the seal to be potentially effective in terms of pressure containment at fluid pressures of 2 Bar (29 p.s.i.) held for a duration of 20 minutes whith a shaft rotation speed of 500 r.p.m. Sample pressure containment of the seal at 95 bar (1378 p.s.i.) in a static test mode has been witnessed and verified by Bureau Veritas. Other tests have shown the seal to be effective at up to 15 Bar (218 p.s.i.) fluid pressure for 30 minutes at a shaft rotation of 1000 r.p.m.

Another embodiment of the invention is illustrated in FIGS. 5(a), 5(b), 5(c). In this embodiment as in the embodiments of FIGS. 1 to 4, a split seal 1 of generally cylindrical form having an annular cross-section and a central axis X comprises two components 2,3 of arcuate form. The seal 1 has a radial width $\delta_r$ and an axial length l. The two components are identical and each has a first end portion 4,4' and a second end portion of 5,5'. As in the split seal shown in FIGS. 1 to 4, each end portion of the seal 1 comprises a contact face F1,F2 defined by a series of teeth or leading edges which provide six discrete oppositely angled surfaces 6',7' in each contact face F1,F2. The teeth of each end portion 4,5 of one component are arranged in mating engagement with the teeth of the complemetary end portion of the other component 3 of the seal so as to form the assembled split seal as in FIG. 5a, where the seal 1 is shown assembled round a piston or other element 30. The piston is located for reciprocal transitional movement along the axis X in this embodiment of the seal. In other applications, the element 30 may be static. As shown in FIGS. 5(b) and (c), each of the angled surfaces 6',7' extends at an angle Z of 60 degrees to the central axis X of the seal. Each contact face F1,F2 extends substantially continuously in non-reentrant manner radially of the seal 1. The contact faces F1,F2 can slide smoothly across one another in a generally radial direction without causing damage to the angled surfaces 6',7'. As the components 2,3 are identical they can thus be interchanged, thereby eliminating the need for "complete ring" seal replacement which in the past has required dismantling of major components and subsequent "downtime" of equipment.

The seal 1 of FIGS. 5(a), 5(b) and 5(c) operates in a similar manner to that of FIGS. 1 to 4, the main difference being that the similarly angled surfaces of the matingly engaged end portions of the components 2,3 bear axially against each other under fluid pressures acting generally axially on the upper 32 or lower 34 axial end surfaces of the seal, in use of the seal. The contact faces F1,F2 present a labyrinth-like path to any fluid attempting to enter the seal between the contact faces F1,F2.

The seal of FIGS. 5(a), (b) and (c) has been found to perform effectively in terms of pressure containment at fluid pressures up to 150 Bar in a static test mode (i.e. where the piston 30 or other element which the seal 1 surrounds is static).

What is claimed is:

1. A split seal having an annular cross-section and a central axis, and having a radial width and an axial length, comprising at least two components of arcuate form, each component having two end portions and each end portion having a surface formed and arranged for mating engagement with a respective complementary end portion surface of another said component, wherein each end portion surface comprises a plurality of angled surface portions extending in substantially zigzag manner over one of the radial width and the axial length of the seal, each angled surface portion intersecting a common axial plane of the seal, and each end portion surface extending substantially continuously in non-reentrant manner over the other one of the radial width and the axial length of the seal, so that the components are substantially smoothly, relatively translatable in a generally radial direction or a generally axial direction, respectively.

2. The split seal according to claim 1, wherein two said matingly engaged components are relatively translatable by substantially rectilinear movement of one component relative to the other component.

3. The split seal according to claim 1, wherein two said matingly engaged components are relatively translatable by movement including a rotational component of movement.

4. The split seal according to claim 3 wherein two said matingly engaged components are relatively translatable by substantially helical movement of one component relative to the other.

5. The split seal according to claim 1 wherein said plurality of angled surface portions extend in substantially zigzag manner in the plane of the annular cross-section of the seal, between the radially inner and radially outer faces of the seal, each angled surface portion extending, in the plane of the annular cross-section of the seal, at an angle to, and intersecting, an outer radius of the seal, and each end portion surface of the seal extends substantially continuously in non-reentrant manner axially of the seal so that the matingly engaged components are substantially smoothly, relatively translatable in a direction generally axially of the seal for assembly of the split seal around a shaft in use thereof.

6. The split seal according to claim 5, wherein at least one surface portion which extends at an angle to, and intersects, an outer radius of the seal is provided on each end portion of each seal adjacent to a radially inner annular surface of the seal, said surface portions of each seal component adjacent the radially inner annular surface of the seal being formed and arranged so as to lead rearwardly away from a direction of rotation of a rotating element surrounded by the seal in use thereof.

7. The split seal according to claim 1, wherein said plurality of angled surface portions extend in substantially zigzag manner, between the first and second axial end faces of the seal, each angled surface portion extending at an angle to the central axis of the seal.

8. The split seal according to claim 1, wherein said plurality of angled surface portions comprises pairs of oppositely angled surface portions.

9. The split seal according to any preceding claim, wherein each end portion of each component comprises a saw-toothed configuration.

10. A split seal according to claim 9 wherein the teeth of the saw-toothed configuration have radiused tips.

11. The split seal according to claim 1, wherein said plurality of angled surface portions are provided in the form of angled grooves cut into the seal.

12. The split seal according to claim 11 wherein of each groove is in the range of fifty to seventy degrees.

13. The split seal according to claim 11 wherein the angle of each groove is substantially sixty degrees.

14. The split seal according to claim 1, wherein the two end portions of each component are complementary whereby said components are interchangeable and replaceable by like components.

15. The split seal according to claim 1, wherein the seal is machined from aluminum.

16. The split seal according to claim 1, wherein said components of the seal are injection molded in plastics material.

17. The split seal according to claim 1, wherein said components of the seal are formed of resin-impregnated carbon.

18. The split seal according to claim 1, wherein the surfaces of said components of the seal are coated with a resilient material.

19. A component for incorporation in a split seal of annular cross-section having a central axis, the component being of arcuate form and comprising two end portions and each end portion having a surface formed and arranged for mating engagement with a respective complementary end portion surface of another such component, wherein each end portion surface comprises a plurality of angled surface portions extending in substantially zigzag manner, in the plane of the annular cross-section of the seal, between radially inner and radially outer faces of the seal, each angled surface portion intersecting a common axial plane of the seal, and each end portion surface extending substantially continuously in non-reentrant manner axially of the seal so that the component is substantially smoothly translatable with respect to the other component, when the components are matingly engaged, in a direction generally axially of the seal.

20. A component for incorporation in a split seal of annular cross-section having a central axis, the component being of arcuate form and comprising two end portions and each end portion having a surface formed and arranged for mating engagement with a respective complementary end portion surface of another such component, wherein each end portion surface comprises a plurality of angled surface portions extending in substantially zigzag manner, between first and second axial end faces of the seal, each angled surface portion intersecting a common axial plane of the seal, and each end portion surface extending substantially continously in non-reentrant manner radially of the seal so that the component is substantially smoothly translatable with respect to the other component, when the components are matingly engaged, in a direction generally radially of the seal.

21. A split seal having an annular cross-section and a central axis comprises at least two components of arcuate form, each component having two end portions and each end portion having a surface formed and arranged for mating engagement with a respective complementary end portion surface of another said component, in which each end portion surface extends in an indirect manner, in the plane of the annular cross-section of the seal, at at least one portion between the radially inner and radially outer faces of the seal, which end portion surface extends substantially continuously in non-reentrant manner axially of the seal so that the matingly engaged components are substantially smoothly, relatively translatable in a direction generally axially of the seal for assembly of the split seal around a shaft in use thereof, characterised in that at least one surface portion which extends at an angle to, and intersects, an outer radius of the seal is provided on each end portion of each seal component, adjacent to a radially inner annular surface of the seal, said surface portions of each seal component adjacent the radially inner annular surface of the seal being formed and arranged so as to lead away from a direction of rotation of a rotating element surrounded by the seal in use thereof.

22. The split seal according to claim 21 wherein a substantial extent of each said end portion surface extending in an indirect manner is inclined at an angle to the outer radius of the seal.

23. The split seal according to claim 21, wherein each said end portion surface extends in zigzag manner.

* * * * *